(12) United States Patent (10) Patent No.: US 8,650,325 B2
Sharkey (45) Date of Patent: Feb. 11, 2014

(54) ESTABLISHING NETWORK CONNECTIONS

(71) Applicant: Google Inc., Mountain View, CA (US)

(72) Inventor: Jeffrey A. Sharkey, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/631,168

(22) Filed: Sep. 28, 2012

(65) Prior Publication Data

US 2013/0060653 A1 Mar. 7, 2013

Related U.S. Application Data

(63) Continuation of application No. PCT/US2012/053660, filed on Sep. 4, 2012.

(60) Provisional application No. 61/530,395, filed on Sep. 1, 2011.

(51) Int. Cl.
*G06F 15/16* (2006.01)

(52) U.S. Cl.
USPC ............ 709/240; 709/227; 709/228; 709/202

(58) Field of Classification Search
USPC .................. 709/225, 232–235, 240, 227, 228
See application file for complete search history.

(56) References Cited

U.S. PATENT DOCUMENTS

| | | | |
|---|---|---|---|
| 5,479,411 A | 12/1995 | Klein | |
| 6,148,197 A | 11/2000 | Bridges et al. | |
| 6,363,251 B1 | 3/2002 | Huang et al. | |
| 6,381,315 B1 | 4/2002 | Nhaissi | |
| 6,690,936 B1 | 2/2004 | Lundh | |
| 6,931,109 B1* | 8/2005 | Cook | 379/114.02 |
| 6,965,948 B1* | 11/2005 | Eneborg et al. | 709/250 |
| 7,076,447 B1 | 7/2006 | Peyser et al. | |

(Continued)

FOREIGN PATENT DOCUMENTS

WO WO 02/41580 5/2002
WO WO 2004/047476 6/2004

OTHER PUBLICATIONS

'AppleInsider.' "Apple granted patent where carriers bid to provide service to iPhones," 2011, [retrieved on Jan. 26, 2012]. Retrieved from the Internet: URL: <http://www.appleinsider.com/articles/11/02/09/apple_granted_patent_where_carriers_bid_for_iphone_service.html>. 6 pages.

(Continued)

*Primary Examiner* — Hieu Hoang
(74) *Attorney, Agent, or Firm* — Fish & Richardson P.C.

(57) ABSTRACT

In one implementation, a computer-implemented method includes receiving, at a computing device and from an application installed on the computing device, a request to establish a network connection to transmit and receive data over a network, wherein the request includes information that indicates one or more parameters identified by the application for the requested network connection and data transmission. The method can further include delaying, by the computing device, establishing the requested network connection until i) an available network connection is identified that satisfies the one or more parameters provided as part of the request, or ii) a time period specified for the request has expired. The method can additionally include, in response to identifying an available network that satisfies the one or more parameters before the time period has expired, establishing the requested network connection for the application using the identified available network.

23 Claims, 6 Drawing Sheets

(56) References Cited

U.S. PATENT DOCUMENTS

| | | | |
|---|---|---|---|
| 7,130,912 B2* | 10/2006 | Nishikado et al. | 709/229 |
| 7,433,929 B2 | 10/2008 | Guilford et al. | |
| 7,466,655 B1* | 12/2008 | Zhao | 370/238 |
| 7,548,976 B2 | 6/2009 | Bahl et al. | |
| 7,885,654 B2 | 2/2011 | Fadell | |
| 7,907,938 B2 | 3/2011 | Brok | |
| 8,036,367 B2 | 10/2011 | Baluja | |
| 8,238,965 B2 | 8/2012 | Baluja et al. | |
| 2002/0046166 A1 | 4/2002 | Kitchen et al. | |
| 2002/0111915 A1 | 8/2002 | Clemens et al. | |
| 2002/0138398 A1 | 9/2002 | Kalin et al. | |
| 2002/0169716 A1 | 11/2002 | Johnson et al. | |
| 2003/0154118 A1* | 8/2003 | Druyan et al. | 705/8 |
| 2004/0246920 A1 | 12/2004 | Savolainen | |
| 2005/0022001 A1 | 1/2005 | Bahl et al. | |
| 2005/0114860 A1* | 5/2005 | Lin et al. | 718/100 |
| 2006/0056353 A1 | 3/2006 | McBride | |
| 2006/0083171 A1 | 4/2006 | Tanaike et al. | |
| 2006/0256772 A1 | 11/2006 | Yarlagadda | |
| 2007/0008926 A1 | 1/2007 | Oba | |
| 2007/0249287 A1* | 10/2007 | Das et al. | 455/68 |
| 2008/0096486 A1* | 4/2008 | Whitten | 455/66.1 |
| 2008/0162689 A1 | 7/2008 | Krishnamurthy et al. | |
| 2010/0202287 A1* | 8/2010 | Diaz et al. | 370/230 |
| 2010/0251241 A1* | 9/2010 | Cardelli et al. | 718/100 |
| 2012/0002640 A1 | 1/2012 | Baluja et al. | |

OTHER PUBLICATIONS

Campbell "Mobiware: QOS-aware middleware for mobile multimedia communications" Multimedia Tools and Applications 7, 67-82 (1998) 18 pages.

Duan et al. "Competition with Dynamic Spectrum Leasing." Academic Paper, Department of Information Engineering, the Chinese University of Hong Kong, 2010, 18 pages.

Erich Bircher et al.: "An Agent-Based Architecture for Service Discovery and Negotiation in Wireless Networks" Wired/Wireless Internet Communications; [Lecture Notes in Computer Sciences; LNCS], Springer-Verlag, Berlin/Heidelberg, vol. 2957, Jan. 21, 2004.

Google "Link Capabilities.java" (2010) https://android.googlesource.com/platform/frameworks/base/+/master/core/java/android/net/LinkCapabilities.java.

Google "LinkSocket.java" (2010) https://android.googlesource.com/platform/frameworks/base/+/master/core/java/android/net/LinkSocket.java.

Katz et al. "A Revolutionary Confederated Service Architecture for Future Telecommunications Systems." Program Proposal, University of California, Mar. 13, 2001, 23 pages.

International Search Report and Written Opinion in International Application No. PCT/US2012/053660, dated Nov. 16, 2012, 13 pages.

* cited by examiner

ESTABLISHING NETWORK CONNECTIONS

CROSS-REFERENCE TO RELATED APPLICATIONS

This application is a bypass continuation filed under 35 U.S.C. §111(a) that claims priority under 35 U.S.C. §§120 and 365(c) to International Application No. PCT/US2012/053660, filed Sep. 4, 2012, which claims priority to U.S. Provisional Application Ser. No. 61/530,395, filed on Sep. 1, 2011. The entire contents of which are incorporated herein by reference.

TECHNICAL FIELD

This document generally relates to establishing network connections from a computing device.

BACKGROUND

Applications on a computing device often use a network connection to transmit data to and to receive data from other computing devices. For example, an internet browser, which is installed on a computing device connected to the internet via a local area network ("LAN"), may send a request to a remote server for a web page. The remote server can respond to the request by transmitting data associated with the web page to the computing device, fulfilling the internet browser's request. A network connection between computing devices can be established by opening network sockets that create channels over available network connections for bilateral communication of data between the computing devices.

In another example, mobile computing devices, such as smartphones, often run software applications that use network connections to send data to and receive data from other computing devices. Mobile computing devices can transmit data over wireless network connections, such as an IEEE 802.11 WI-FI connection and/or through a public land mobile network ("PLMN") that uses cellular radiotelephone network standards such as the Enhanced Data GSM Environment ("EDGE"), Code Division Multiple Access ("CDMA"), and/or Long Term Evolution ("LTE"). A mobile computing device can establish a network connection that is usable by one or more applications by opening a socket for bilateral communication of data between an application and another computing device. Once a socket is open and a network connection is established, transmission of data between a mobile computing device and another computing device can commence.

SUMMARY

This document generally describes methods, techniques, and systems for establishing network connections and transmitting data between computing devices. Computing devices can use information provided with network connection requests to select an optimal network on which to establish the requested connection.

For example, an application on a computing device can request that the computing device establish a network connection over which data may be communicated (e.g., transmitted and/or received). The request may include parameters associated with the communication such as the identity of the requesting application, the amount and type of data to be communicated across the network, and the maximum latency and/or minimum bandwidth of a network that is sufficient to carry the communication. The parameters may also include, for example, a delay parameter that indicates an acceptable delay for the computing device to establish a network connection that satisfies the parameters provided by the application. The computing device can then use the parameters from the request to find a suitable network with which to connect. If a suitable network is not immediately available, the computing device, for instance, may delay establishing a connection within the acceptable delay period until a suitable network is found. Or, if the acceptable delay period expires and no suitable network has been found, the computing device may discard the request.

Additional implementations can include mechanisms for selecting and/or delaying network connections based on costs. For example, the computing device may have a budget that limits the costs associated with network connections. The computing device may delay establishing a network connection until a network is available that can service a request at a price within the budget. If no networks are available to service a request within budget, the request can be discarded. The computing device can also manage costs by negotiating among networks to service requests at the lowest cost possible. If more than one network can service a request within budget, the computing device may select an optimal network on which to establish a network connection based in part on the network's cost.

In one implementation, a computer-implemented method includes receiving, at a computing device and from an application installed on the computing device, a request to establish a network connection to transmit and receive data over a network, wherein the request includes information that indicates one or more parameters identified by the application for the requested network connection and data transmission. The method can further include delaying, by the computing device, establishing the requested network connection until i) an available network connection is identified that satisfies the one or more parameters provided as part of the request, or ii) a time period specified for the request has expired. The method can additionally include, in response to identifying an available network that satisfies the one or more parameters before the time period has expired, establishing the requested network connection for the application using the identified available network.

These and other implementations can optionally include one or more of the following features. The one or more parameters identified by the application can include a minimum network bandwidth parameter that indicates a minimum network bandwidth for the requested network connection and a maximum network latency parameter that indicates a maximum network latency for the requested network connection. The available network connection can satisfy the minimum network bandwidth parameter when the available network connection has an available bandwidth that is greater than or equal to the minimum network bandwidth and satisfies the maximum network latency parameter when the available network connection has a current latency that is less than or equal to the maximum network latency. The one or more parameters identified by the application can include a total data size parameter that indicates a total size of the data to be transmitted and received for the requested network connection. The available network connection can satisfy the total data size parameter when the available network connection has a minimum bandwidth sufficient to transmit and receive the total size of the data within a threshold period of time. The one or more parameters identified by the application can include an acceptable delay parameter that indicates a period of time within which the requested network connection is permitted to be delayed. The available network connection can satisfy the acceptable delay parameter when the available network connection is identified within the period of time from when the request was received.

The method can further include ranking the received request among a group of other requests for network connections from other applications installed on the computing device. The requested network connection can be established when the received request has at least a threshold ranking among the other requests. The requests can be ranked based on at least a cost of transmitting and receiving data for each request. The cost of transmitting and receiving each request can be based on a total size of data to be transmitted and received for each request and a cost per data unit to transmit and receive data over one or more available networks. The threshold ranking can be determined based on a network connection budget for the computing device that indicates an amount of money that is available for the computing device to spend to transmit and receive data over network connections. The requests can be ranked based on at least an inferred importance of each of the requests. The inferred importance of each of the requests can be determined based on at least a type of data to be transmitted and an indication of whether a user of the computing device is currently interacting with one or more applications that are associated with each of the requests.

The method can further include, in response to identifying one or more available networks, requesting bids from the one or more available networks, receiving bids for the one or more available networks, wherein the bids indicate costs for transmitting and receiving the requested data over the one or more available networks, selecting an available network from the one or more available networks based on at least the received bids, and establishing the requested network connection with the selected available network. Each of the one or more available networks from which the bids are requested can satisfy the one or more parameters.

The one or more parameters can include a quality parameter that indicates a plurality of levels of quality that are permitted to be used for the requested network connection and data transmission. The method can further include identifying one or more available networks that are able to transmit and receive the requested data at one or more of the plurality of levels of quality specified by the quality parameter, and selecting one of the identified available networks that is able to transmit and receive the requested data at a greatest level of quality from among the plurality of levels of quality. The requested network connection can be established using the selected available network.

In another implementation, a mobile computing device includes a wireless networking antenna and a network connection manager that is programmed to receive a request to establish a network connection to transmit and receive data over a network. The request can include information that indicates one or more parameters identified for the requested network connection and data transmission. The mobile computing device can further include a request manager that is programmed to i) delay establishing the requested network connection until an available network connection is identified that satisfies the one or more parameters provided as part of the request, and ii) in response to identifying an available network that satisfies the one or more parameters and before a time period specified for the request has expired, establish the requested network connection with the identified available network using the wireless networking antenna.

These and other implementations can optionally include one or more of the following features. The mobile computing device of can further include a connection pricing negotiator that is programmed to request and receive bids from the one or more available networks, wherein the bids indicate costs for transmitting and receiving the requested data over the one or more available networks. The mobile computing device can further include a request ranking module that is programmed to rank the received request among a plurality of other requests for network connections based, at least in part, on the bids received by the connection pricing negotiator. The network connection manager can further programmed to select one or more requests from among the received request and the plurality of requests based, at least in part, on the ranking generated by the ranking request module.

In another implementation a computer program product embodied in a computer readable storage device including instructions that, when executed by one or more computing devices, cause the one or more computing devices to perform operations including receiving, from an application installed on the one or more computing devices, a request to establish a network connection to transmit and receive data over a network, wherein the request includes information that indicates one or more parameters identified by the application for the requested network connection and data transmission. The operations can further include delaying establishing the requested network connection until i) an available network connection is identified that satisfies the one or more parameters provided as part of the request, or ii) a time period specified for the request has expired. The operations can further include, in response to identifying an available network that satisfies the one or more parameters before the time period has expired, establishing the requested network connection for the application using the identified available network.

The details of one or more implementations are set forth in the accompanying drawings and the description below. Various advantages can be provided. For example, delaying the establishment of a network connection until a network is available that has sufficient capacity (e.g., acceptable bandwidth and latency characteristics) to meet an application's minimum requirements for an effective data communication more efficiently uses both client computing resources and network resources. Additionally, automatic delays in establishing network connections to transmit and receive data can reduce costs to the application's user, for example, by reducing the use of inadequate connections and the costs associated with such usage. Automatic delays can also restrict transmissions until a time when the user's budget allows for network usage. Further, users can save money by client computing devices negotiating with one or more available networks to connect to a lowest-cost network that satisfies the parameters of an application's request.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
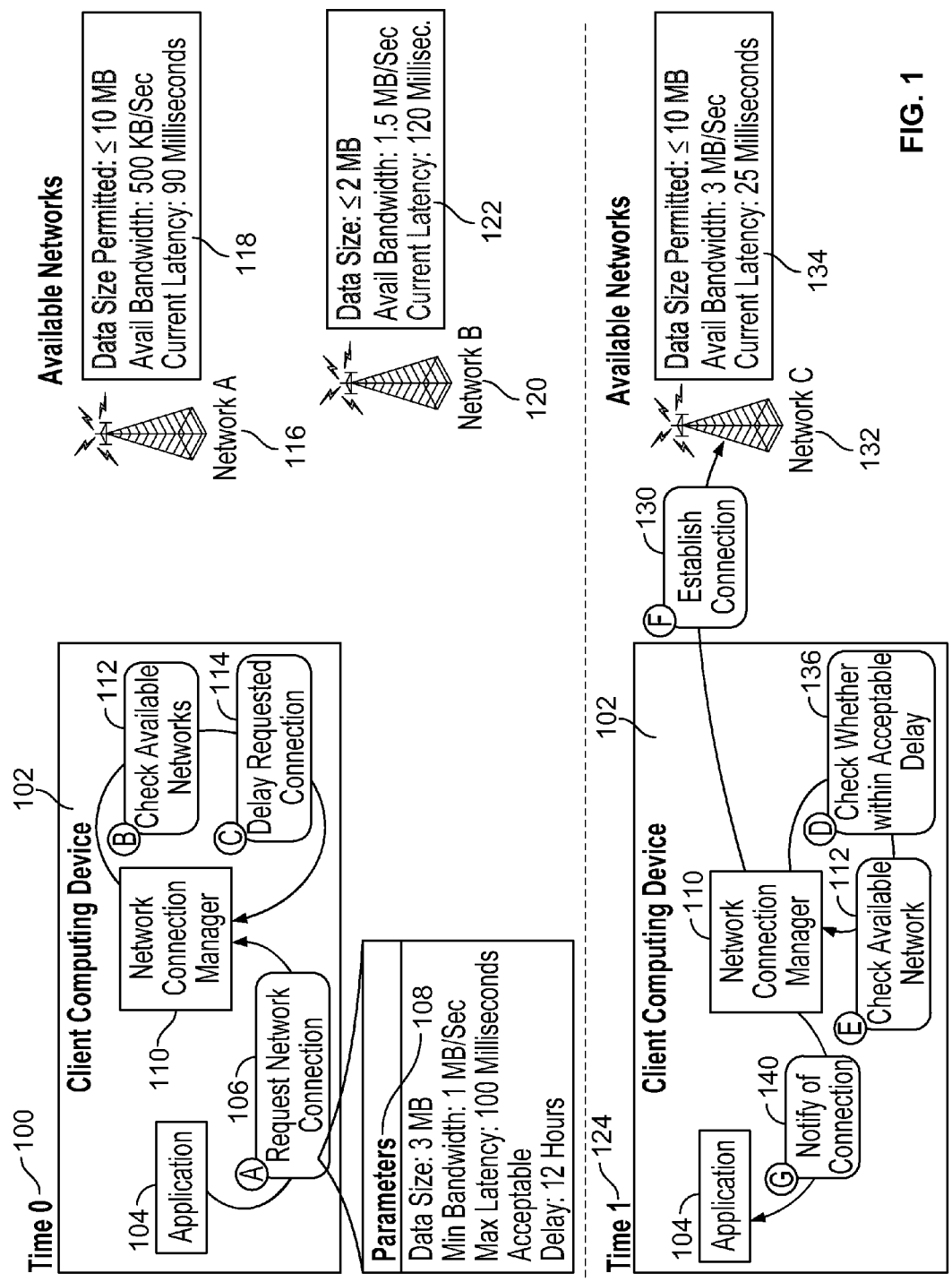
FIG. 1 is a conceptual diagram of an example system for establishing a requested network connection based on associated connection parameters.

This document generally describes techniques, methods, systems, and computer program products for more optimally establishing network connections. For example, computing devices such as smartphones often run multiple applications, at times simultaneously, that each require connections to a network to transmit or receive data. For instance, a user may configure an e-mail application to periodically synchronize with a remote e-mail server and to download recent e-mail messages, which requires the smartphone to connect with the server over a network. Generally, smartphones today will automatically service the e-mail application's request by immediately opening a socket and transmitting and receiving the e-mail data over any network on which the smartphone is connected. However, immediately establishing a connection is not always necessary or desirable. For instance, if the smartphone is connected to a slower network, then downloading e-mail messages such as those having multimedia attachments could strain the network's bandwidth and the smartphone's processing capacity for a prolonged time, which may reduce available computing power and drain a device's battery unnecessarily.

A computing device can manage requests from applications to establish network connections to improve network performance of the device. For instance, a computing device can delay establishing a connection or transmitting and receiving data until a network with sufficient bandwidth becomes available or until performance characteristics (e.g. bandwidth, latency) of currently available network(s) improve to at least a threshold level. The likelihood that a mobile computing device will encounter networks having varying performance (and/or cost) characteristics over a period of time may be quite high. For instance, as mobile computing devices (e.g. smartphones) travel with their users between home, work, and other locations, for example, computing devices may have access to multiple WI-FI, EDGE, and/or LTE networks depending on where the computing devices are located geographically. A mobile computing device that only has access to an EDGE network at a time when an application makes a request to establish a network connection can delay establishing the connection until a later time when the device has access to a faster network, such as a WI-FIl or LTE network.

A variety of techniques can be used to manage competing requests from multiple applications for network connections. For instance, computing devices may receive requests for network connections at or around the same time from multiple applications, but the computing device and/or the available networks may not have sufficient capacity to establish each of the network connections with their associated parameters (e.g., minimum bandwidth, maximum latency). Such competing network connection requests can be ranked according to a variety of factors (e.g., an inferred importance based on whether the request was made in response to user input or from a background process) to identify which, if any, requested network connections a computing device should establish at a given time.

A variety of techniques can also be used to manage money that is spent to establish network connections. For instance, network providers (e.g., wireless network providers, internet service providers (ISP)) can charge users for access to and usage of their networks. For example, network providers can charge users fees for unlimited use over a period of time; session fees based on the length of time the user accesses the network; session fees proportional to the amount of data transmitted and received; and/or fixed fees that allow any amount of network use up to a predetermined maximum, which can be expressed as a cap on the amount of data that can be transmitted and received over the network by the user's devices. To manage an amount of money that is spent over such paid connections, computing devices can negotiate pricing with network providers and/or can select network connection requests to establish based on associated costs and available funds for such connections. For example, a user can provide his/her computing device with a monthly budget (e.g., $30/month) for paid network connections and the computing device can use this budget, in addition and/or alternatively to other techniques, to determine which requested network connections to establish.

These features, as well as other features not previously mentioned, are described below in greater detail with regard to the figures.

FIG. 1 is a conceptual diagram of an example system for establishing a requested network connection based on associated connection parameters. FIG. 1 depicts a network connection manager 110 of a client computing device 102 that is configured to delay establishing a requested network connection 106 until a network is found that meets connection parameters 108 provided by an application 104 in association with the request 106. In the depicted example, an application 104 (e.g., email application, web browser application, social network application) of the client computing device 102 provides the request 106 for a network connection at time 0 (100) when there are no networks available that satisfy the parameters 108 for the request 106 (e.g., Network A (116) and Network B (120) available at time 0 do not satisfy the parameters 108), and the network connection manager 110 delays establishing the requested connection until time 1 (124) when a network becomes available that satisfies the parameters 108 of the request 106 (e.g., Network C (132) available at time 1 satisfies the parameters 108).

The client computing device 102 can be any of a variety of electronic computing devices, such as smartphones, tablet computing devices, electronic readers, laptop computers, and/or desktop computers. The client computing device 102 is depicted as running application 104, which can be one or more computer programs (e.g., software, firmware, hardware) whose operation includes, to some extent, transmitting and/or receiving data over a network. The application 104 can be any of a variety of applications, such as web browsers, games, email clients, system update routines, voice over IP ("VoIP") services. The application 104 can be run locally as a standalone application and/or can be run as a thin client on computing device 102 that interacts with another computing device over a network to provide features to a user (e.g., application running in the cloud).

In step A (106) the application 104 produces a request for a network connection 106 that is communicated to a network connection manager 110. For instance, the application 104 can make a call to an application programming interface (API) to establish a network socket that the application 104 can use to communicate to another computing device. Such an API can include and/or be associated with the network connection manager 110, and can direct the call made by the application 104 to the network connection manager 110. The request 106 from the application 104 can include one or more parameters 108 that specify one or more preferences and/or requirements for the requested network connection 106 (e.g., minimum bandwidth). For instance, the application 104 can provide the parameters 108 with a call to an API to establish a network socket (e.g., socket(min bandwidth, max latency, max delay)). The network connection manager 110 can use the parameters 108 to determine how and when to establish a network connection for the request 106.

The particular parameters 108 may vary among different applications 104, as well as among the various requests 106 produced from an individual application 104. The parameters 108 can include any combination of information and/or constraints associated with network connections, such information relating to an identity and/or status of an application, types of data to be transmitted and/or received (e.g., video, text), quantities of data to be transmitted and/or received, minimum bandwidth required for a network connection, a maximum acceptable delay to establish a network connection, and/or a maximum latency allowable for a network connection. In FIG. 1, example parameters 108 include an amount of data (three MB) to be transmitted and/or received as part of the requested network connection 106, a minimum bandwidth of one megabits per second, a maximum latency of one-hundred microseconds (ms), and an acceptable delay of twelve hours for establishing the requested network connection 106.

The parameters 108 provide the network connection manager 110 with information that it can use to determine which requested connections to establish and when to establish them. For example, the application 104 can be a digital music and multimedia application (e.g., ITUNES) that makes a request 106 to download an audio file (e.g., song) from a remote server system in response to a user providing input to the application 104 to purchase the audio file. The application 104 can provide the parameters 108 as part of the request 106 based on a variety of factors, such as user specified settings (e.g., user indicated that he/she is willing to wait twelve hours for audio file downloads), a type of data being transmitted and/or received, and/or default configurations for the application 104 (e.g., minimum performance for application 104 requires the parameters 108).

Once the network connection manager 110 receives the request 106, the client computing device 102 proceeds to check for available networks as depicted in step B (112). In FIG. 1, two available networks are illustrated as Network A (116) and Network B (120). Depending on the type of client computing device 102 and the hardware and software associated with the device 102, the range of available networks that the device 102 may connect to can vary. Laptop and desktop computers may have access to various local area networks ("LANs"), wireless area networks ("WANs"), or even to broadband wireless networks such as EDGE, CDMA, and/or LTE networks. Mobile computing devices, such as smartphones and/or tablet computing devices, also may have access to a host of networks through WI-FI, BLUETOOTH, and/or broadband wireless networks such as EDGE, CDMA, and/or LTE networks. For instance, the network connection manager 110 can cause the client computing device 102 to scan for available networks using one or more network interfaces.

In checking for available networks in step B (112), the client computing device 102 can register various characteristics and/or parameters 118 and 122 of the available networks A (116) and B (120), respectively. The client computing device 102 can determine the network parameters 118 and 122 in a variety of ways, such as through classification of the network technology, network signal strength to the device 102, and/or through the receipt of network information and/or parameters provided directly from the networks A and B.

In FIG. 1, at time 0 (100), the client computing device 102 detects two available networks 116 and 120 after checking for networks in step B (112). The parameters 118 of Network A (116) indicate that the network permits data transactions of no more than 10 MB, has a bandwidth of 500 Kb/s, and its current latency is 90 ms. The parameters 122 of Network B (120) indicate that Network B (120) permits data transactions of no more than 2 MB, has a bandwidth of 1.5 Mb/s, and that its current latency is 120 ms. However, in the depicted example the request 106 made by application 104 is for a 3 MB transaction over a network having at least a 1 Mb/s bandwidth and at most a 100 ms latency. Based on the parameters 118 and 122 for the networks A and B, respectively, the currently available networks A and B at time 0 (100) do not satisfy the parameters 118 for the requested network connection 106. For example, the bandwidth of Network A (116) is inadequate and Network B (120) similarly fails to meet the requirements of the request 106 because it will not transmit or receive more than 2 MB of data and it has an unacceptable latency. Based on this determination, the client computing device 102 can delay establishing the requested network connection 106 until a later time when a network is available that satisfies the request parameters 108, as shown in step C (114).

The network connection manager 110 can store the request 106 until an available network is encountered that satisfies the parameters 108 and/or until the acceptable delay for establishing the network connection, as indicated in the parameters 108, has been exceeded. In the example of FIG. 1, the client computing device 102 can continue to search for available networks that satisfy the parameters 108 of the request 106 for 12 hours, which is the acceptable delay period. The computing device 102 can continually loop through steps B (112) and C (114) within the delay period, checking for available networks and delaying establishing the requested network connection 106 until a network is found that satisfies the parameters 108.

At time 1 (124), after continuing to search for an available network and delaying establishment of network connections as shown in step B (112) and step C (114) at time 0 (100), the client computing device 102 finds Network C (132). Unlike Network A (116) and Network B (120) at time 0 (100), Network C (132) satisfies the parameters 108 of the application request 106. For instance, Network C (132) has sufficient data transaction capacity, bandwidth, and sufficiently low latency such that its parameters 134 exceed the threshold network requirements of the application's 104 network connection request 106 and the request's 106 associated parameters 108.

If the computing device 102 finds a network that meets the requisite parameters 108 before expiration of the request's 106 acceptable delay period, a network connection may be established. For example, once the computing device 102 finds Network C (132) to be a suitable network to service request 106, the network connection manager 110, depicted in step D (136), checks whether the acceptable delay period from the parameters 108 has expired. If the request 106 has expired, then a network connection will not be established. However, in the example of FIG. 1, the elapsed time between time 0 (100) and time 1 (124) is less than the acceptable delay period of twelve hours; therefore, the client computing device 102, through the network connection manager 110, establishes a connection in step F (130) with Network C (132). For example, the network connection manager 110 can create a network socket for the application 104 and can establish a connection with Network C (132) (e.g., authenticate the client computing device 102 with Network C (132)). In conjunction with establishing the network connection at step F, the network connection manager 110 can notify the requesting application 104 that the requested network connection 106 has been established with an available network and that the application 104 can transmit or receive data using the established connection.

Figure 2:
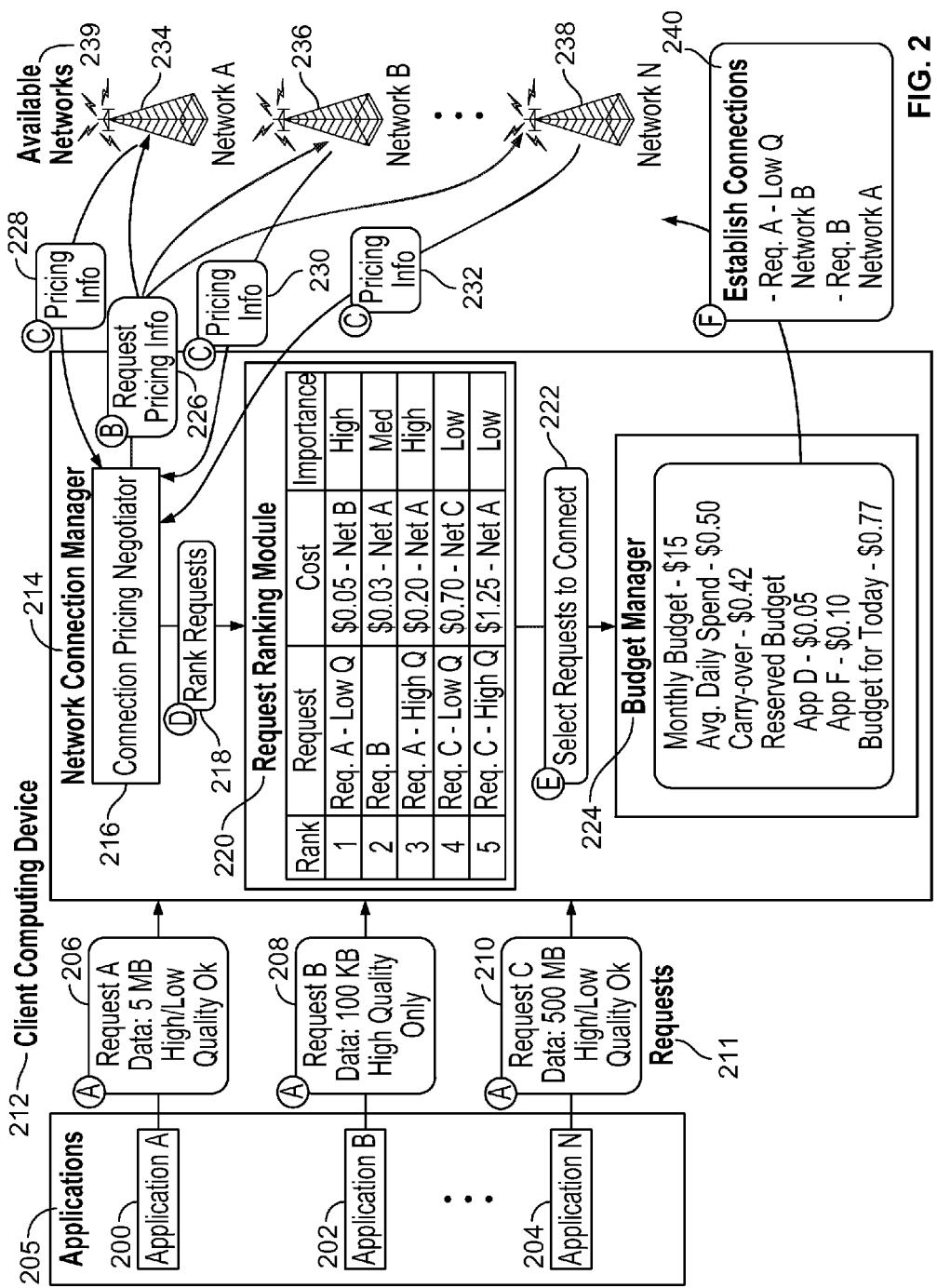
FIG. 2 illustrates various functional elements of a network connection manager including ranking requests, managing connection budgets, and negotiating prices among available networks.

FIG. 2 is a conceptual diagram that depicts an example client computing device 212 that manages multiple requests 211 to establish network connections. The example client computing device 212 includes multiple different applications 205 that provide the requests 211 for network connections to a network connection manager 214 of the client computing device 212. The network connection manager 214 can use a variety of techniques to select which, if any, requested network connections to establish. For instance, the network connection manager 214 can rank the requests 211 based on a variety of factors, such as costs for the network connections.

The client computing device 212 can be any of a variety of appropriate electronic computing devices, such as a laptop computer, a desktop computer, a netbook, a mobile telephone, a smartphone, a tablet computing device, and/or a computer server system. The client computing device 212 is depicted as running the applications 205, which can be one or more computer programs (e.g., software, firmware, hardware, or any combination thereof) whose operation includes, to some extent, transmitting and/or receiving data over a network. The applications 205 can be any of a variety of applications, such as web browsers, games, e-mail clients, system update routines, and/or VoIP services. The applications 205 can be run locally as standalone applications and/or can be run as a thin client on the computing device 212 that interacts with another computing device over a network to provide features to a user (e.g., application running in the cloud). The example applications 205 are depicted as including Application A (200), Application B (202), and Application N (204).

The applications 205 can make and provide the requests 211 to the computing device 212 to establish and/or use a network connection. The requests 211 can include one or more request parameters, such as network constraints associated with the request (e.g., minimum bandwidth, maximum latency); an acceptable delay parameter indicating a timeframe for the device 212 to service the requests 211; one or more data parameters indicating the quantity of data to be transmitted and/or received; cost constraints indicating how much money and/or how much of a user's network budget the is available for each of the requests 211; and/or other information that the computing device 212 may use in establishing and using network connections, such as the identity of a requesting application (e.g., e-mail client, game, web browser), information indicating whether the requests 211 are based on user input or are part of a background task, and/or whether a user is actively using the applications 205.

For example, the request 206 from Application A (200) includes parameters indicating that the request 206 is to transmit and/or receive up to 5 MB of data over a network. In another example, the request 208 from Application B (202) includes parameters indicating that the request 208 is to transmit and/or receive 100 KB of data. In a further example, the request 210 from Application N (202) includes parameters indicating that the request 210 is to transmit and/or receive 500 MB of data.

The applications 205 can also include information in the requests 211 that indicates which transmission qualities are acceptable for a requested network connection. For example, an application that receives and plays streaming video content from an Internet video service, such as YOUTUBE, may include information indicating that streaming high, medium, or low quality versions of videos is permissible for the network connection. In contrast, some network connections requests may specify that only a particular connection quality is permissible. The applications 205 and/or a user can prioritize which quality level is preferred, and which quality levels are permissible. Each quality level may also be associated with different network parameters. For instance, streaming a high quality video may need a network connection having a minimum bandwidth of 5 Mb/s, whereas a low quality video can be streamed using only 1 Mb/s connection. The requests 211 can include information identifying one or more minimum quality levels for a requested network connection and associated network parameters. Or the requests 211 can simply indicate which quality levels are acceptable such that the computing device 212 can infer the network parameters associated with each acceptable quality level. Thus, in Step A, the applications A (200), B (202), and N (204) each make a request (206, 208, and 210, respectively) for a network connection. Request A (206) includes a quality parameter indicating that a network connection for either a high quality or low quality data transmission is acceptable. On the other hand, Request B (208) indicates that a network connection capable of carrying a high quality data transmission is required for the requested network connection.

The computing device 212 can manage incoming requests 211 for network connections and determine when to connect to an available network 239 and which available network(s) to connect to. For example, in FIG. 2, the computing device 212 is depicted as having a network connection manager 214. The network connection manager 214 can be located on the computing device 212 as a standalone application, integrated into software, hardware, and/or firmware, or run as a thin client on the computing device 212. The network connection manager receives incoming requests 211 for network connections and determines how to service the requests by establishing connections to available networks 239.

In order to minimize the costs of network usage, the network connection manager 214 includes a connection pricing negotiator 216 that can find and/or negotiate pricing information regarding network connections from one or more of the available networks 239. For example, in a basic implementation, the pricing negotiator 216 may query each available network 239, or just those available networks 239 that satisfy the parameters of one or more requests 211, for the costs of establishing a connection to the networks and/or the costs of servicing the requests 211. Thus, in Step B (226), the connection pricing negotiator 216 sends a request for pricing information to Network A (234), Network B (236), and Network N (238). In Step C (228-232), each of the available networks 239 (e.g., Network A (234), Network B (236), and Network N (238)) transmit their pricing information back to the computing device 212 where the network connection manager 214 can use the information in determining which networks to connect to and in other aspects of managing network connections.

The computing device 212 can also use more sophisticated routines for negotiating prices among one or more available networks 239. For instance, the connection pricing negotiator 216 can send information to the network that includes more details about the connection requests 211 that the device 212 is attempting to establish, such as information about the quantity of data to be transmitted, the type of content to be transmitted (e.g., HTML, audio, video), the anticipated length of time for using the network connection, the bandwidth intended to be used, and other factors that can affect a network's pricing bid. Further, pricing negotiations could involve dynamic communications among the computing device 212 and one or more of the available networks 239 to allow the available networks to compete to offer a lowest bid.

The network connection requests 211 can also be ranked in the order in which they are to be serviced. In FIG. 2, ranking takes place in Step D (218) by a request ranking module 220. Ranking can be based on one or more factors such as the importance of a request, the cost of a request, the order and time in which the requests 211 were received, and/or the remaining time that a request can be delayed. For example, the request ranking module 220 ranked Request A (206), Request B (208), and Request C (210) based on the cost of each request and the importance of each request. The cost of the requests 211 can be determined by the connection pricing negotiator 216. The importance of the requests 211 can be determined based on factors such as the identity of an application (e.g., e-mail client, game, web browser) that provided the request, information as to whether a request originates from user input or is provided as part of a background task, and/or whether the user is actively using an application from which the request was received. The importance may also be influenced by parameters communicated by the applications 205 in the requests 211 itself. Request ranking module 220 shows, for instance, that a low-quality connection for Request A (206) is ranked first due to its combination of low cost and high importance. Request B (206) is ranked second despite having a lower cost than low-quality Request A (206) because it is only of medium importance. However, Request B (208) is ranked higher than a high-quality version of Request A (206) because of its substantially lower cost, despite have a lower importance than Request A (206).

The computing device 212 can also use a budget to manage how network connections are established and/or which requests 211 are serviced. For instance, the costs of establishing network connections and using network resources can sometimes exceed the costs that a user desires to spend over a given time period (e.g., an hour, a day, a week, a month). The user can provide the computing device 212 with a budget that limits the expenses the device 212 can spend on network connections. A budget can be implemented in various forms including daily and/or monthly allowances.

In FIG. 2, the network connection manager 214 includes a budget manager 224 that restricts establishing network connections which would cause the budget to be exceeded. For example, the budget in FIG. 2 includes $15 to spend on network connections monthly. In a 30-day month, this equates to an average of $0.50 available to spend daily. A user can exceed a daily or monthly budget, for instance, if the user instructs the computing device 212 to do so. In the budget example shown in budget manager 224, $0.42 have been carried over from previous days when the amount(s) spent on network connections fell below the budgeted maximum. Combining the amount rolled-over and the daily allocation gives a total of $0.92 to spend on network connections for the day.

The user and/or the computing device 212 can reserve portions of the budget for use by one or more applications. For example, security software may perform periodic checks for updates or an e-mail client may periodically ping a remote server and download new e-mails. To ensure that enough money is budgeted each day for these tasks, some portion of the budget can be dedicated to those requests. The user may indicate which applications or tasks should have a reserved budget and the size of the reserves, or they may be inferred by the computing device 212, such as by tracking and analyzing which programs historically have required frequent use and the associated costs. A reserve budget can be maintained based on other factors as well, such as estimations of how much additional network use will be required for the remainder of the day. In FIG. 2, Application D and Application F, which are not explicitly shown among the applications 205, have a reserved daily budget of $0.05 and $0.10, respectively. The budget manager 224 discounts the reserved costs from the day's total available budget, leaving $0.77 ($0.92−$0.05−$0.10) of non-reserved funds available for network connections for the day.

The budget manager 224 manages the costs of establishing and/or using network connections in order to stay within a budget. In the exemplary depiction of FIG. 2, the network connection manager 214 proceeds through the requests 211 in ranked order selects requests to use for network connections, as indicated by Step E (222), and establishes a connection on one or more of the available networks 239 for requests that are permitted within the available budget. For instance, in Step F (240), the computing device 212 establishes a connection with Network B (236) to service low-quality Request A (206) at a cost of $0.05, and then a connection is made with Network A (234) to service Request B (208) at a cost of $0.03. No connection is made for Request C (210) because the connection cost would exceed the available budget after servicing Request A (206) and Request B (208). The connection might be made, for instance, if a user granted special permission to exceed the budget.

Figure 3:
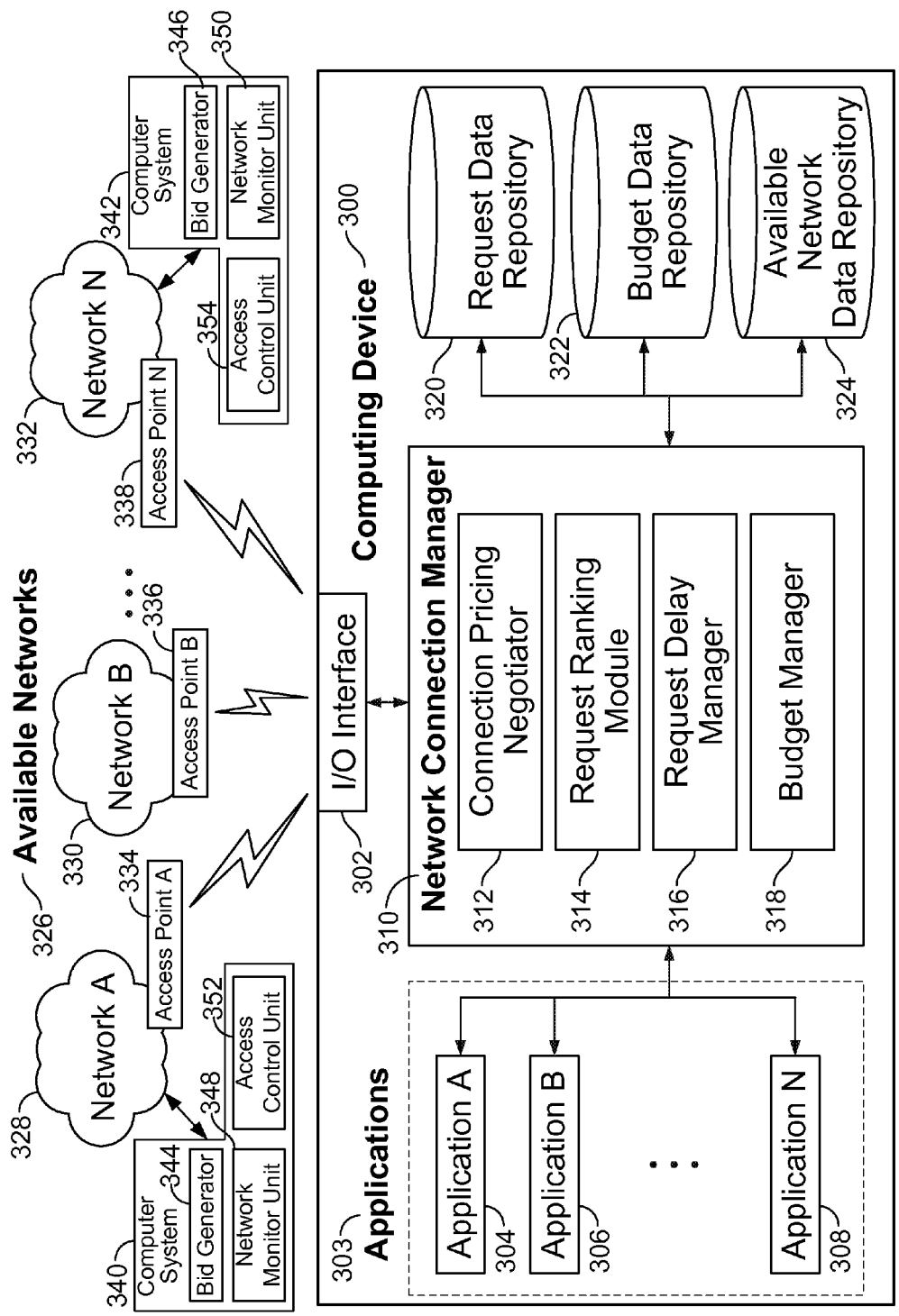
FIG. 3 depicts a system diagram of a computing device having a network connection manager interfacing with various data repositories, client applications, and available networks.

FIG. 3 is a system diagram of a computing device 300 that may be used to implement the systems and methods described in this document. The computing device 300 can be any of a variety of appropriate electronic devices, such as cellular phones, smartphones, tablet computing devices, desktop computers, laptop computers, personal digital assistants, servers, and other like devices. The computing device 300 can be similar to the computing devices 102 and 212 described above with regard to FIGS. 1 and 2, respectively.

The computing device 300 can include an input/output ("I/O") interface 302 that connects the computing device 300 to one or more of a plurality of available networks 326, such as Network A (328), Network B (330), and/or any other available network, as indicated by Network N (332). The I/O interface 302 can transmit data from the computing device 300 to available network(s) 326 and receive data on a computing device 300 from available network(s) 326. The I/O interface 302 can be a wired and/or wireless interface. For example, a wired I/O interface 302 can be any of a variety of interfaces including Ethernet, IEEE 1394, parallel port, PS/2, serial port, USB, VGA, Digital Visual Interface (DVI), and/or USB. Likewise, a wireless I/O interface 302 can be any of a variety of interfaces including an IEEE 802.11 WI-FI transceiver, a 3G radio transceiver, an LTE radio transceiver, a BLUETOOTH transceiver, and/or others.

The computing device 300 can connect to one or more available networks 326 via the I/O interface 302. Network A (328), Network B (330), and Network N (332) represent a range of available networks 326 to which the computing device 302 may connect. The available networks 326 can include wired networks and/or wireless networks, such as local area networks ("LANs"), wireless area networks ("WANs"), and/or broadband wireless networks such as EDGE, CDMA, and/or LTE networks. The available networks 326 have been similarly represented in FIG. 1 as Networks A and B (116 and 120, respectively), and in FIG. 2 as the available networks 239.

The computing device 300 can run one or more applications 303. The applications 303 may be one or more computer programs, including software, firmware, and/or hardware. The operation of one or more of the applications 303 can include, to some extent, transmitting and/or receiving data over a network. Specific applications 303 can include web browsers, games, e-mail clients, system update routines, VoIP services, and/or other computer programs. The applications 303 in the FIG. 3 system can be similar to the application 104 and the applications 205 described above with regard to FIG. 1 and FIG. 2, respectively.

The computing device 300 can also include various data repositories 320, 322, 324 that store information relevant to managing and establishing network connections. For example, one or more of the data repositories 320, 322, 324 can be stored in volatile memory media, such as a random access memory ("RAM") device, and/or the data repositories 320, 322, 324 can be stored in non-volatile memory media such as a compact disc ("CD"), DVD, hard-disk drive, FLASH memory, EPROM, EEPROM, magnetic disk drive, or holographic storage. The data repositories 320, 322, 324 may be stored locally on the computing device 300, in removable memory such as an SD card, and/or can be stored remotely, such as on a server.

A request data repository 320 can include stored information regarding requests for network connections that the applications 303 have provided. The information associated with the network connection requests can be stored in the request data repository 320, such as the identity of the requesting program; a timestamp marking a time when the request was received; the request's cost and importance as described above with regard to FIG. 2; parameters associated with the request such as the parameters 108 described above with regard to FIG. 1 including data size, minimum bandwidth, acceptable delay, and maximum latency; and/or any combination thereof.

A budget data repository 322 can include information relating to a budget that limits and/or manages the costs expended on network connections. For example, the budget data repository 322 can include data representing a monthly budget, a daily budget, carryover amounts, reserved budgets for one or more applications 303, and/or a current total daily budget. The budget data repository 322 can include data similar to the budget data shown and described above in budget manager 224 in FIG. 2.

An available network data repository 324 can include information relating to available networks 326. For instance, the available network data repository 324 may include information regarding which networks 326 are presently available, historical data regarding available networks 326, and/or parameters associated with one or more available networks 326 such as the type of network (e.g., IEEE 802.11g, IEEE 802.11n, Ethernet LAN, CDMA, LTE) and/or network characteristics (e.g. latency, bandwidth, signal strength).

The computing device 300 can include also include a network connection manager 310 which can manage requests for network connections and determine when and how to service the requests. For example, the network connection manager 310 may comprise one or more computer programs which may be software, firmware, and/or hardware. The network connection manager 310 can be similar to the network connection manager 105 described above with regard to FIG. 1 and the network connection manager 214 with regard to FIG. 2. The network connection manager 310 can include access to requests provided by applications 303. In addition, the connection manager 310 can access stored data used in managing the establishment of network connections from resources such as the request data repository 320, budget data repository 322, and/or the available network data repository 324.

The network connection manager 310 can include a variety of functional aspects including a connection pricing negotiator 312, a request ranking module 314, a request delay manager 316, a budget manager 318, and/or any combination thereof.

The connection pricing negotiator 312 can find and/or negotiate pricing information from one or more of the available networks 326. For example, the connection pricing negotiator 312 can perform operations that are similar to those described above with regard to the connection pricing negotiator 216 described with regard to FIG. 2.

The request ranking module 314 can manage one or more requests from the applications 303 by sorting and/or ranking the requests based on factors including a known or estimated cost for servicing the request, an importance associated with the request, and/or any combination thereof. The request ranking module 314 can perform operations that are similar to those described above with regard to as the request ranking module 220 described above with regard to FIG. 2.

The request delay manager 316 can manage the requests that are pending in the request data repository 320 and can remove requests from the repository 320 that have exceeded their acceptable delay. When a request is removed from the repository 320, an application that provided the request can be notified that the network connection manager 310 was unable to fulfill the request. The request delay manager 316 can perform operations that are similar to those described above with regard as the network connection manager 110 described above with regard to FIG. 1.

The budget manager 318 can manage the costs of establishing and/or using network connections in order to stay within a budget. The budget manager 318 can perform operations that are similar to those described above with regard as the budget manager 224 described above with regard to FIG. 2.

The networks A-N (328-332) can each include one or more wireless access points (e.g., wireless transceivers, cellular network towers, wireless routers, wireless range extenders/repeaters) from which wireless signals for the networks A-N (328-332) are transmitted and received. For instance, the networks A-N (328-332) are depicted in FIG. 3 as being associated with example access points 334-338. Each of the networks A-N (328-332) can be associated with (include) multiple access points.

The networks A-N (328-332) can also each be associated with computer systems that manage network access and use by client computing devices, such as the computing device 300. For example, the network A 328 is associated with a computer system 340 and the network N 332 is associated with computer system 342. The computer systems 340 and 342 can each include one or more computing devices, such as a desktop computer, a computer server, a distributed computing system (e.g., cloud computing system, networked computer servers), and/or other appropriate computing devices. Although not depicted, the network B 330 can be associated with a computer system similar to the computer systems 340 and 342.

The computer systems 340 and 342 are depicted as including bid generators (344 and 346), network monitor units (348 and 350), and access control units (352 and 354). The bid generators 344 and 346 can generate bids for client computing devices, such as the computing device 300, that are requesting access to the networks 328 and 332. The bids generated by the bid generators 344 and 346 can be based a variety of information, such as predetermined pricing information (e.g., predetermined pricing ranges within which bids are bound, pricing schedules based on data quantities and transmission speed), current network usage information (e.g., current number of connected client computing devices, current bandwidth usage, current available bandwidth), future network usage commitments (e.g., agreements entered into with other computing devices for network access, minimum network performance parameters for such agreements), and/or information that indicates current supply and demand for network access (e.g., number of requests for bids from client computing devices, network parameters included on client bid requests, previous bid amounts that have been accepted and/or declined by client computing devices). The bid generators 344 and 346 can provide bids to the computing device 300 using the access points 334 and 338, respectively.

The network monitor units 348 and 350 of the computer systems 340 and 342, respectively, can monitor and determine current network usage statistics for the networks A and N (328 and 332). The network monitor units 348 can collect usage statistics (e.g., latency information, used bandwidth, available bandwidth) from various components of the networks 328 and 332, such as usage information from routers, switches, access points, and/or other appropriate computing devices. The network monitor units 348 and 350 can provide network usage statistics to the bid generators 344 and 346, which can generate bids based on current usage information. The network monitor units 348 and 350 may additionally and/or alternatively provide some network usage statistics to client computing devices, such as the computing device 300, to inform the client computing devices as to current network conditions for the networks 328 and 332, which the client computing devices can use to determine whether to establish network connections with the networks 328 and 332 using the access points 334 and 338.

The access control units 352 and 354 can control access to the networks 328 and 332 by client computing devices, such as the computing device 300, through the access points 334 and 338. The access control units 352 and 354 can instruct the access points 334 and 338 to restrict access to only client computing devices which are currently authorized to use the networks 328 and 332, which may be indicated by various identifying information provided by the client computing devices, such as unique identifiers (e.g., MAC addresses, usernames) and/or authentication information (e.g., authorization credentials). The access control units 352 and 354 may restrict access to the networks 328 and 332 to client computing devices that have accepted bids from the bid generator 344 and for which a payment method has been established (e.g., credit card has been verified, debit account has been identified with sufficient available balance).

Figure 4A:
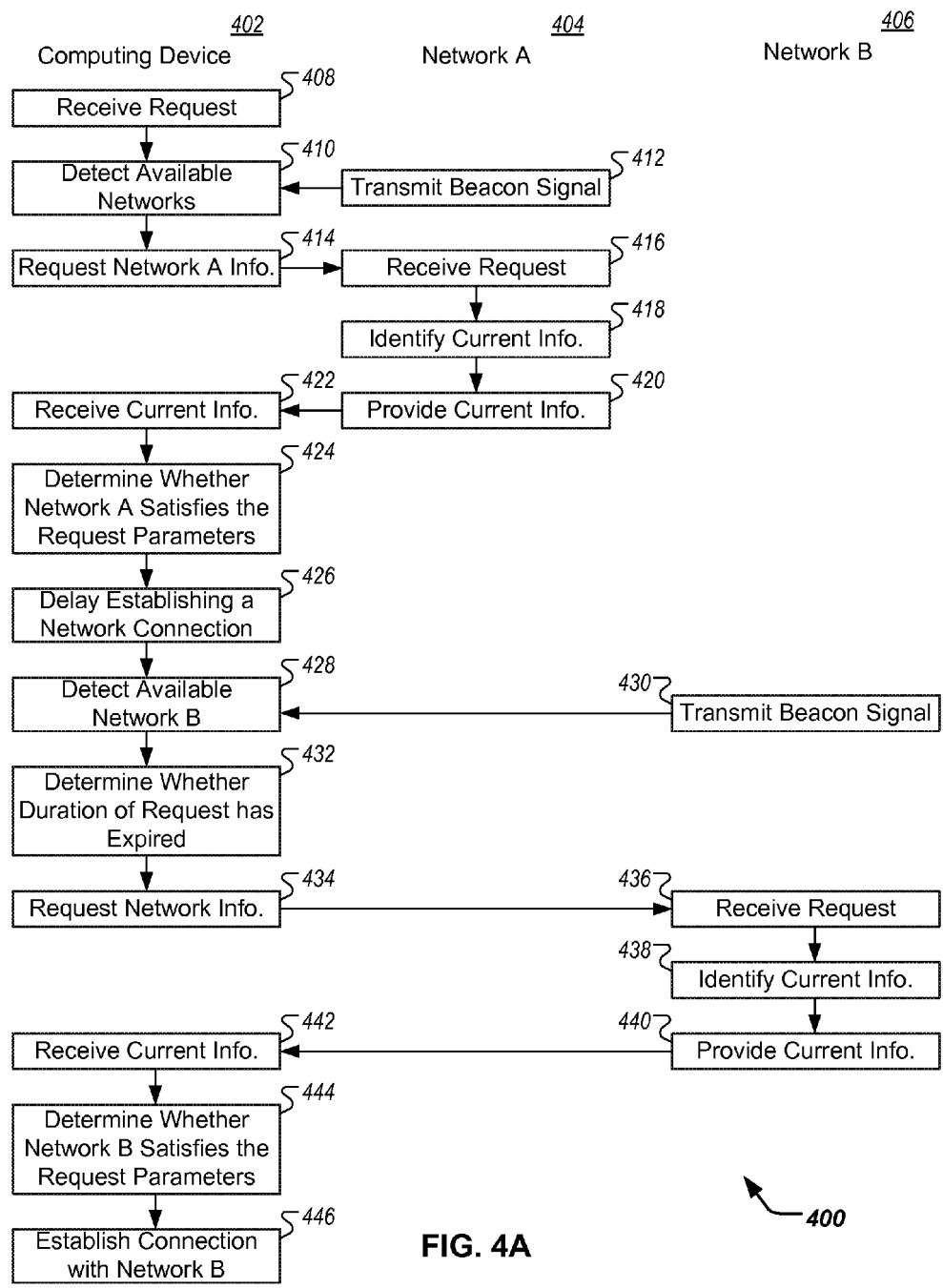
FIGS. 4A-B are flowcharts of example techniques for establishing network connections.
Figure 4B:
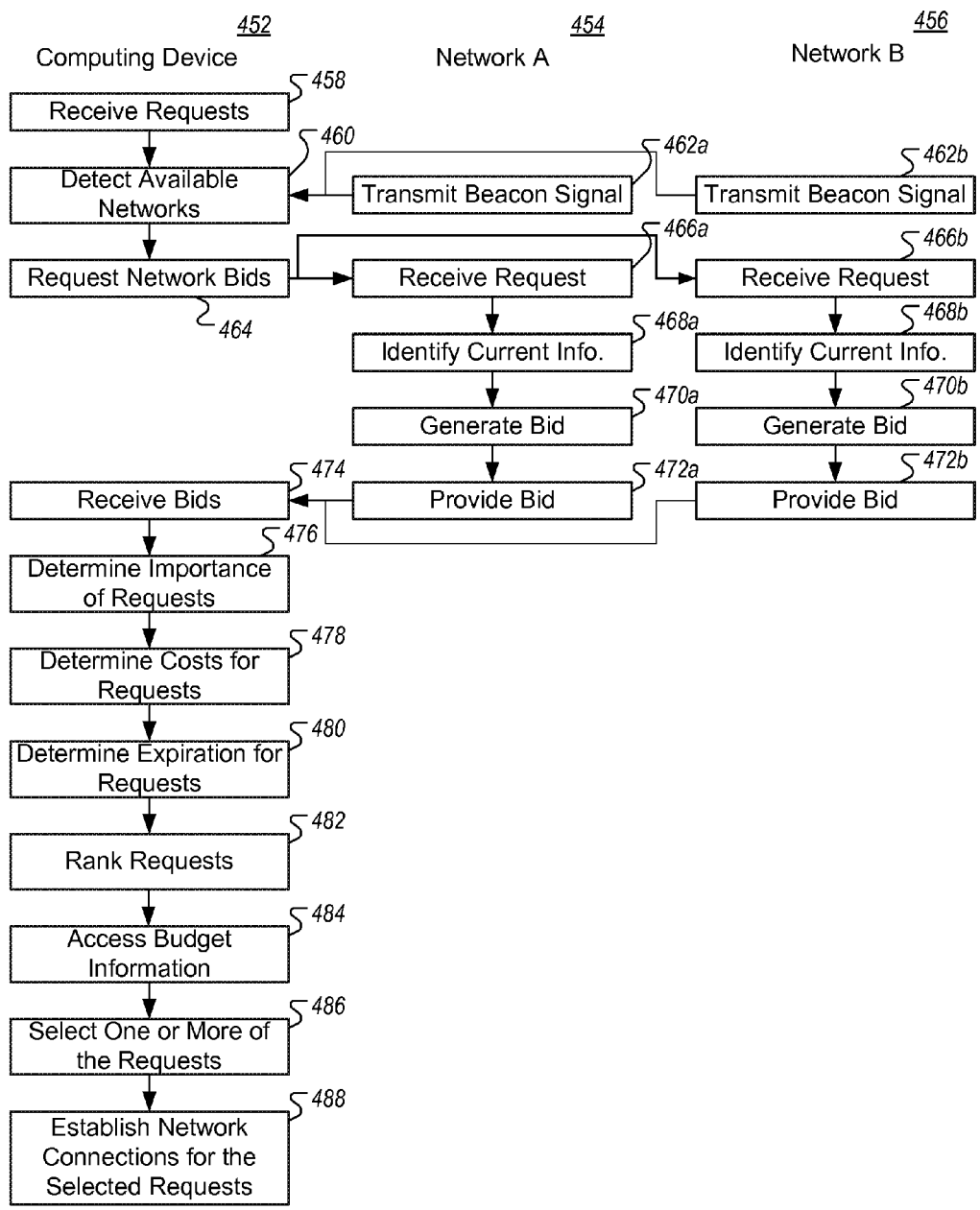

FIGS. 4A-B are flowcharts of example techniques 400 and 450 for establishing network connections. In the technique 400, an example computing device 402 determines for a period of time whether to establish a connection with available networks based on one or more parameters (e.g., minimum bandwidth, maximum latency). In the technique 450, an example computing device 452 determines whether to establish one or more requested networks connections with one or more available networks based on bids that are obtained for the available networks. The example techniques 400 and 450 can be combined, in whole or in part.

Referring to FIG. 4A, portions of the example technique 400 are performed by the computing device 402, a network A (404), and a network B (406). The computing device 402 can be any of a variety of appropriate computing devices, such as the computing device 102, the computing device 212, and/or the computing device 300. The networks A (404) and B (406) can be any of a variety of appropriate wireless networks, such as the networks 116, 120, and 132; the networks 234, 236, and 238; and/or the networks 328, 330, and 332. The networks A (404) and B (406) can each include one or more access points, such as the access points 334-338, and can include one or more associated computer systems, such as the computer systems 340 and 342.

The computing device 402 can receive a request to establish a network connection (408). For example, the computing device 102 receives a request (106) to establish a network connection from the application 104. The received request can include one or more parameters for the requested network connection, such as the example parameters 108 discussed above with regard to FIG. 1. In response to receiving the request, the computing device 402 can detect available networks (410). For example, the computing device 402 can use a wireless transceiver to scan for beacon signals from nearby networks, such as a wireless beacon signal that is transmitted by the network A 404 (412). In response to detecting the beacon signal transmitted by an access point for the network A (404), the computing device 402 can transmit a request to the network A 404 current network information (e.g., available bandwidth, current latency).

The network A (404) can receive the request from the computing device 402 (416) and, in response to receiving the request, can identify current network information (418). For example, the network monitor unit 348 of the computer system 340 can identify current network information for the network A 328. The network A (404) can provide the current network information (420) and the computing device 402 can receive the current information for the network A 404 (422).

Using the current network information, the computing device 402 can determine whether the network A satisfies the parameters for the network connection that were included in the request to establish the network connection (424). For example, the network connection manager 110 of the client computing device 102 can compare the requested parameters 108 with the current network information 118 and 122 for the networks 116 and 118, respectively, to determine whether to establish a connection with the networks 116 and/or 118. When the current network information does not satisfy the parameters set forth in the request, the computing device 402 can delay establishing a network connection (426).

In response to detecting another available network (428) based on a beacon signal transmitted by another network (430), the computing device 402 can determine whether a permissible duration of time to establish the requested network connection has expired (432). For example, the network connection manager 110 of the client computing device 102 can check whether an acceptable delay for establishing a network connection requested by the application 104 has elapsed in response to detecting the presence of network C (132). In response to determining that the duration of time for the request has not expired, the computing device 402 can request network information from the network B 406 (434). If the duration of time for the request has expired, the computing device 402 can discard the request and/or provide an indication to the requesting entity (e.g., an application, a user, another computing device that is tethered to the computing device 402) that the requested network connection was not established based on a time period for the request having expired. The network B (406) can receive the request from the computing device 402 (436), identify current network information for the network B (438), and can provide the current network information to the computing device 402 (440), which the computing device can receive (442) and use to determine whether the network B satisfies the parameters set forth in the request (444). The steps 434-444 for network B (406) can be similar to the steps 414-424 for network A (404).

In the depicted example, the network B (406) has current network conditions (e.g., available bandwidth, latency) that satisfy the parameters of the request, similar to the current network conditions of the network C (132) satisfying the parameters 108 of the request described above with regard to FIG. 1. In response to determining that the network B (406) satisfies the parameters of the request, the computing device 402 can establish a network connection with the network B (446). Establishing a connection can include the computing device 402 transmitting information to the network B (406) that indicates a request from the computing device 402 to use the network B (406) and any additional information that may be requested by the network B (406) for access, such as payment information and/or identifying information for the computing device 402 and/or an associated user.

Referring to FIG. 4B, portions of the example technique 450 are performed by the computing device 452, a network A (454), and a network B (456). The computing device 452 can be any of a variety of appropriate computing devices, such as the computing device 102, the computing device 212, the computing device 300, and/or the computing device 402. The networks A (454) and B (456) can be any of a variety of appropriate wireless networks, such as the networks 116, 120, and 132; the networks 234, 236, and 238; the networks 328, 330, and 332; and/or the networks 404 and 406. The networks A (454) and B (456) can each include one or more access points, such as the access points 334-338, and can include one or more associated computer systems, such as the computer systems 340 and 342.

The computing device 452 receives requests to establish network connections from one or more requesting entities (458), such as one or more applications, users of the computing device 452, services that are running on the computing device 452, and/or devices that are tethered to the computing device 452. The requests received by the computing device 452 can each be received separately over a period of time. For example, the client computing device 212 receives the requests 206-210 from the applications 200-204.

In response to receiving the requests, the computing device 452 can detect available wireless networks (460), such as the network A (454) and the network B (456), based on beacon signals that are transmitted by the networks A and B (462a-b). In response to detecting that networks A and B are within range of the computing device 452, the computing device 452 can provide requests for bids to the networks A and B (464). Such requests for bids can include information that identifies parameters for the network connection requests that were received by the computing device 452. For example, the requests for network connection requests can each include one or more connection parameters, such as a minimum connection bandwidth, a maximum latency, a connection quality, and/or an amount of data to be transmitted. The computing device 452 can provide at least a portion of the network connection parameters for the received requests to the networks A and B (454 and 456) as part of the requests for bids.

The networks A and B (454 and 456) can receive the requests (466a-b), can identify current use information for the networks (468a-b), and based, at least in part, on the current use information can generate bids to provide to the computing device 452 (470a-b). For example, the computer systems 340 and 342 can use the network monitor units 348 and 350 to identify the current use of the networks 328 and 332, and can use the access control units 352 and 354 to identify future commitments network use by other computing devices. The bid generators 344 and 346 can generate bids based, at least in part, on the information identified by the network monitor units 348 and 350, and the information identified by the access control units 352 and 354. The networks A and B (454 and 456) can wirelessly transmit the generated bids to the computing device 452 (472a-b).

The computing device 452 can receive the bids (474) and can proceed to use the bid information and/or other information regarding the requests to rank the received requests to determine which, if any, of the requested network connections, should be established. For instance, the computing device 452 can determine the importance of the requests (476), determine the costs for requests based on the received bids from the networks A and B (478), and/or determine timeframes within which the requests will expire (480). Based on such information (e.g., request importance, costs, expiration timeframe), the computing device 452 can rank the requests. For example, the request ranking module of the client computing device 212 can rank the requests 1-5 based on determined costs (determined based on the pricing information 228-232 from the networks 234-238) and determined importance of the requests 1-5.

The computing device 452 can access budget information for the computing device 452 and/or one or more users associated with the computing device 452 (484) and, based on the ranked requests and the budget information, can select one or more of the requests (486). For example, the budget manager 224 of the client computing device 212 can use the information from the request ranking module 220 and budget information (e.g., monthly budget, avg. daily spend amount, carryover amount, reserved budget information, and/or remaining budget for current time period) to select one or more of the requests. The computing device 452 can establish one or more connections with the networks A and/or B for the selected requests (488).

Figure 5:
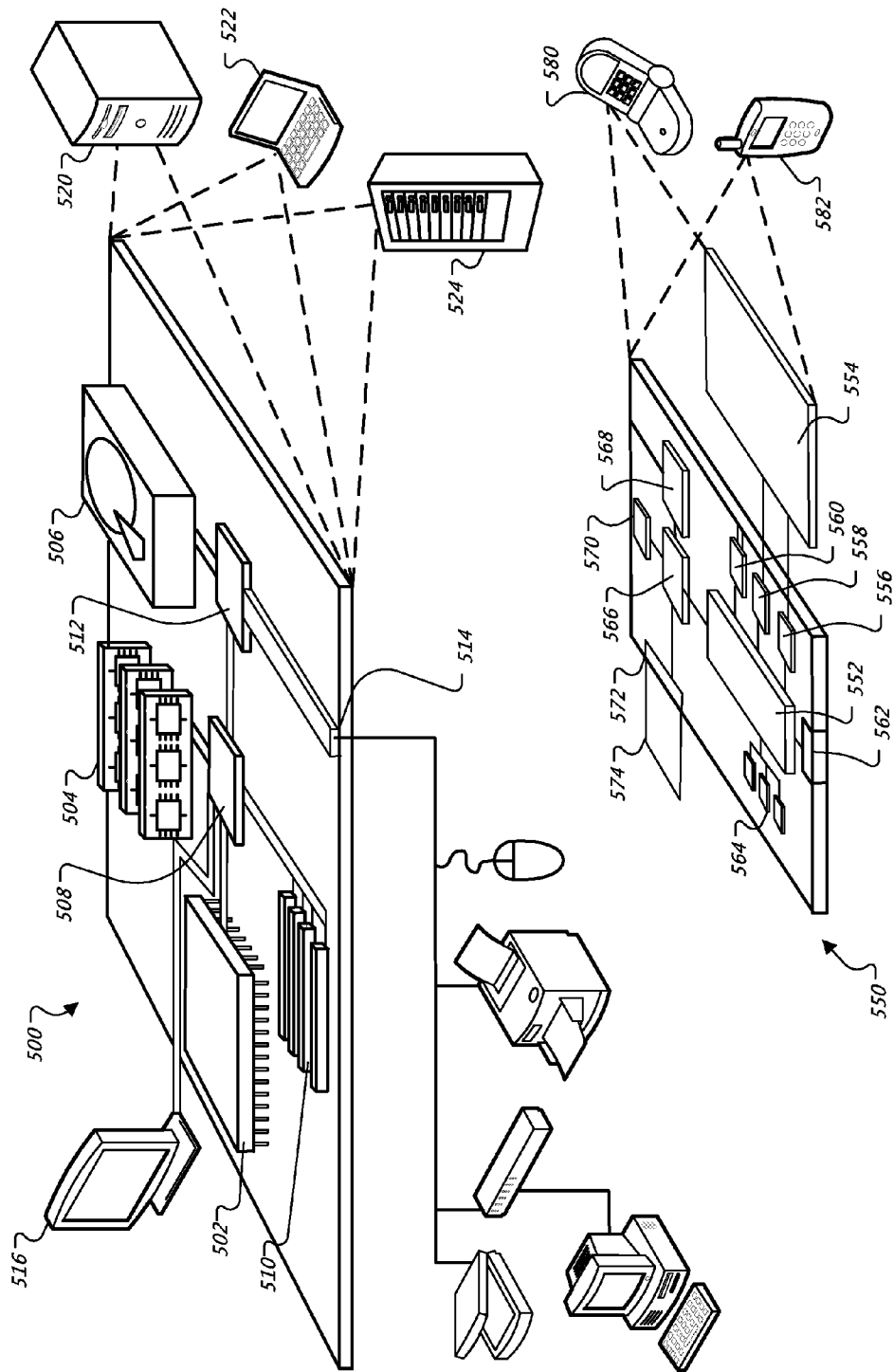
FIG. 5 is a block diagram of example computing devices.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for establishing network connections may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a computing device and from a first application installed on the computing device, a request to establish a network connection to transmit and receive data over a network, wherein the request includes information that indicates one or more parameters identified by the first application for the requested network connection and data transmission;
in response to receiving the request, and before the network connection is established for the request, repeatedly identifying one or more available networks until i) at least one of the identified networks that is available satisfies the one or more parameters provided with the request, or ii) a specified maximum acceptable delay period associated with the request expires; and
in response to identifying an available network that satisfies the one or more parameters before the specified maximum acceptable delay period has expired, establishing the requested network connection for the first application using the identified available network.

2. The computer-implemented method of claim 1, wherein the one or more parameters identified by the first application include a minimum network bandwidth parameter that indicates a minimum network bandwidth for the requested network connection and a maximum network latency parameter that indicates a maximum network latency for the requested network connection.

3. The computer-implemented method of claim 2, wherein the available network satisfies the minimum network bandwidth parameter when the available network has an available bandwidth that is greater than or equal to the minimum network bandwidth and satisfies the maximum network latency parameter when the available network has a current latency that is less than or equal to the maximum network latency.

4. The computer-implemented method of claim 1, wherein the one or more parameters identified by the first application include a total data size parameter that indicates a total size of the data to be transmitted and received for the requested network connection.

5. The computer-implemented method of claim 4, wherein the available network satisfies the total data size parameter when the available network has a minimum bandwidth sufficient to transmit and receive the total size of the data within a threshold period of time.

6. The computer-implemented method of claim 1, wherein the one or more parameters identified by the first application include an acceptable delay parameter that indicates a maximum period of time for which the computing device is permitted to establish the requested network connection.

7. The computer-implemented method of claim 6, wherein the available network satisfies the acceptable delay parameter when the available network is identified within the period of time from when the request was received.

8. The computer-implemented method of claim 1, further comprising:
receiving, at the computing device and from one or more other applications installed on the computing device, one or more other requests to establish network connections;
ranking the received request from the first application among the one or more other requests from the one or more other applications installed on the computing device; and
wherein the requested network connection for the first application is established when the received request from the first application has at least a threshold ranking among the one or more other requests.

9. The computer-implemented method of claim 8, wherein the requests are ranked based at least on a cost of transmitting and receiving data for each request.

10. The computer-implemented method of claim 9, wherein the cost of transmitting and receiving each request is based on a total size of data to be transmitted and received for each request and a cost per data unit to transmit and receive data over one or more available networks.

11. The computer-implemented method of claim 9, wherein the threshold ranking is determined based on a network connection budget for the computing device that indicates an amount of money that is available for the computing device to spend to transmit and receive data over network connections.

12. The computer-implemented method of claim 8, wherein the requests are ranked based at least on an inferred importance of each of the requests.

13. A computer-implemented method comprising:
receiving, at a computing device and from an application installed on the computing device, a request to establish a network connection to transmit and receive data over a network, wherein the request includes information that indicates one or more parameters identified by the application for the requested network connection and data transmission;
delaying, by the computing device, establishing the requested network connection until i) an available network connection is identified that satisfies the one or more parameters provided as part of the request, or ii) a time period specified for the request has expired;
in response to identifying an available network that satisfies the one or more parameters before the time period has expired, establishing the requested network connection for the application using the identified available network; and
ranking the received request among a group of other requests for network connections from other applications installed on the computing device, wherein:
the requested network connection is established when the received request has at least a threshold ranking among the other requests,
the requests are ranked based on at least an inferred importance of each of the requests, and
the inferred importance of each of the requests is determined based on at least a type of data to be transmitted and an indication of whether a user of the computing device is currently interacting with one or more applications that are associated with each of the requests.

14. The computer-implemented method of claim 1, further comprising:
in response to identifying one or more available networks, requesting bids from the one or more available networks;
receiving bids for the one or more available networks, wherein the bids indicate costs for transmitting or receiving the requested data over the one or more available networks;
selecting an available network from the one or more available networks based at least on the received bids; and
establishing the requested network connection with the selected available network.

15. The computer-implemented method of claim 14, wherein each of the one or more available networks from which the bids are requested satisfy the one or more parameters.

16. The computer-implemented method of claim 1, wherein the one or more parameters include a quality parameter that indicates a plurality of levels of quality that are permitted to be used for the requested network connection and data transmission.

17. The computer-implemented method of claim 16, further comprising:
identifying one or more available networks that are able to transmit and receive the requested data at one or more of the plurality of levels of quality specified by the quality parameter;
selecting one of the identified available networks that is able to transmit and receive the requested data at a greatest level of quality from among the plurality of levels of quality; and
wherein the requested network connection is established using the selected available network.

18. A mobile computing device comprising:
a wireless networking antenna; and
one or more processors that are programmed to instantiate:
a network connection manager that is programmed to receive a request to establish a network connection to transmit and receive data over a network, wherein the request includes information that indicates one or more parameters identified for the requested network connection and data transmission; and
a request manager that is programmed to i) repeatedly identify one or more available networks until at least one of the identified networks that is available satisfies the one or more parameters provided with the request, and ii) in response to identifying an available network that satisfies the one or more parameters and before a maximum acceptable delay period specified for the request has expired, establish the requested network connection with the identified available network using the wireless networking antenna.

19. The mobile computing device of claim 18, wherein the one or more processors are further programmed to instantiate:
a connection pricing negotiator that is programmed to request and receive bids from the one or more available networks, wherein the bids indicate costs for transmitting and receiving the requested data over the one or more available networks;
a request ranking module that is programmed to rank the received request among a plurality of other requests for network connections based, at least in part, on the bids received by the connection pricing negotiator; and wherein the network connection manager is further programmed to select one or more requests from among the received request and the plurality of requests based, at least in part, on the ranking generated by the ranking request module.

20. A computer program product embodied in a computer readable storage device including instructions that, when executed by one or more computing devices, cause the one or more computing devices to perform operations comprising:

receiving, from an application installed on the one or more computing devices, a request to establish a network connection to transmit and receive data over a network, wherein the request includes information that indicates one or more parameters identified by the application for the requested network connection and data transmission;

in response to receiving the request, and before the network connection is established for the request, repeatedly identifying one or more available networks until i) at least one of the identified networks that is available satisfies the one or more parameters provided with the request, or ii) a specified maximum acceptable delay period associated with the request expires; and in response to identifying an available network that satisfies the one or more parameters before the specified maximum acceptable delay period has expired, establishing the requested network connection for the application using the identified available network.

21. The computer-implemented method of claim 1, wherein the request to establish the network connection comprises a request to transmit and receive data between the computing device and one or more other computing devices that are identified in the request, wherein the one or more other computing devices are different from one or more access points that provide the one or more available network connections.

22. The mobile computing device of claim 18, wherein the computing device is further programmed to receive a plurality of requests to establish network connections to transmit and receive data over a network, the plurality of requests provided by a plurality of different applications installed on the computing device, each request of the plurality of requests including information that indicates one or more parameters identified by a respective one of the plurality of different applications that provided the request.

23. The computer-implemented method of claim 1, further comprising:

receiving, at the computing device and from a second application installed on the computing device that is different from the first application, a second request to establish a second network connection to transmit and receive data over the network, wherein the second request includes second information that indicates one or more second parameters identified by the second application for the second requested network connection and data transmission;

in response to receiving the second request, repeatedly identifying one or more second available networks until i) at least one of the second identified networks that is available satisfies the one or more second parameters provided with the second request, or ii) a second specified maximum acceptable delay period associated with the second request expires; and in response to identifying a second available network that satisfies the one or more second parameters provided with the second request before the second specified maximum acceptable delay period has expired, establishing the second requested network connection for the second application using the identified second available network.

* * * * *